United States Patent
Gmuer

[11] 3,912,232
[45] Oct. 14, 1975

[54] BLENDING SILO

[75] Inventor: Bruno A. Gmuer, St. Gallen, Switzerland

[73] Assignee: Gebrueder Buehler AG, Uzwil, Switzerland

[22] Filed: Feb. 6, 1974

[21] Appl. No.: 440,278

[30] Foreign Application Priority Data
Feb. 7, 1973  Sweden............................ 731729

[52] U.S. Cl................................. 259/4; 99/646 S
[51] Int. Cl............................................ B01f 15/02
[58] Field of Search.......... 259/4, 18, 95, 150, 180, 259/36; 99/646 S

[56] References Cited
UNITED STATES PATENTS

| | | | |
|---|---|---|---|
| 2,455,572 | 12/1948 | Evans | 259/180 |
| 3,158,362 | 11/1964 | Seifarth | 259/4 |
| 3,317,191 | 5/1967 | Brown | 259/4 |
| 3,421,739 | 1/1969 | Alberts | 259/4 |
| 3,490,655 | 1/1970 | Ledgett | 259/4 |

*Primary Examiner*—Robert W. Jenkins
*Attorney, Agent, or Firm*—Merchant, Gould, Smith & Edell

[57] ABSTRACT

A vertically elongated container for reception of bulk material of different varieties arranged in strata therein, a collecting mechanism underlying the container, and a connecting portion between the container and collecting mechanism. A tubular partition or mantle is disposed in the container and defines with the container an annular storage space communicating with the connecting portion. The mantle has an edge over which material flows from the area inside the mantle to the annular storage space, the edge extending helically within the container. In one embodiment, the helical edge forms the upper edge of the mantle. In another, the helical edge forms one side of a helically extending slot in the mantle. A restricted central passageway extends between the container and the collecting mechanism, the invention further contemplating means for imparting vibration to the collecting mechanism and connecting portion.

8 Claims, 9 Drawing Figures

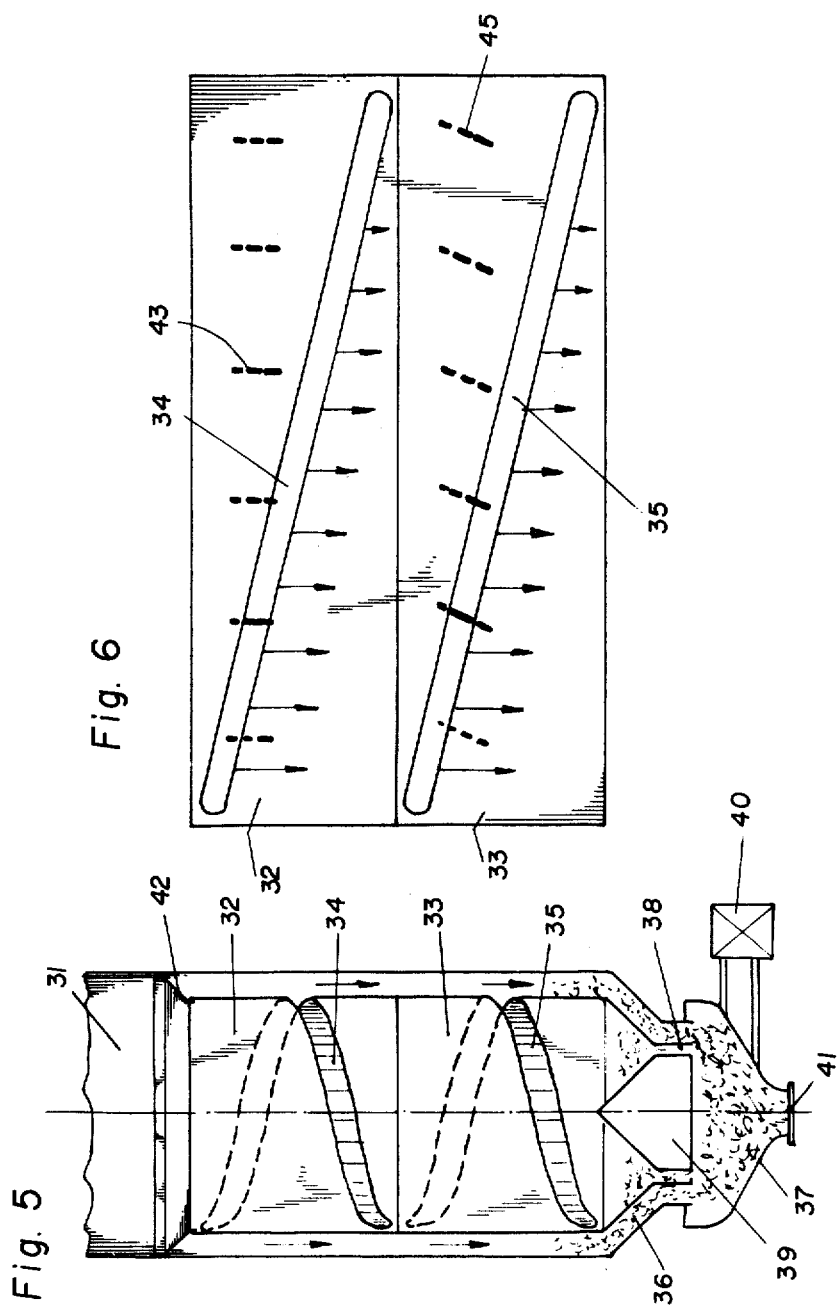

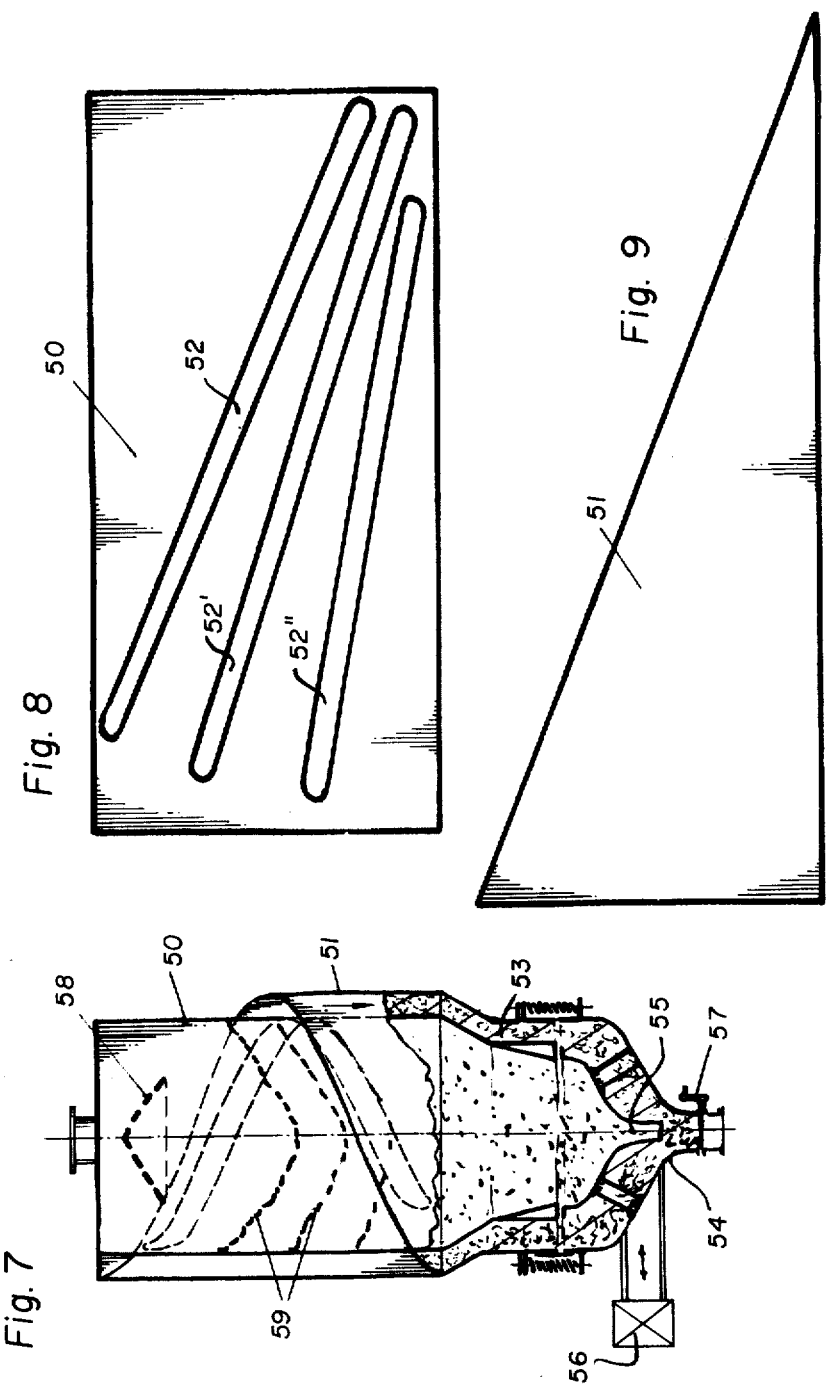

BLENDING SILO

BACKGROUND OF THE INVENTION

The invention refers to a blending silo with a storage space or storage container, below which is located a collection mechanism, and having a connecting element for simultaneous, continuous removal of flowing bulk goods from various levels of the storage space or storage container and for mixing the bulk goods in the collection mechanism through the use of gravity. A blending silo of this type is known which has a container and a collection funnel in addition to a large number of tubes which function as connecting elements between the container and the collection funnel. The tubes are arranged in a circle over the entire height of the container. Each tube has several lateral openings distributed evenly over its height. All the tubes open at the bottom into a common collection funnel, into which the product removed via the openings flows.

Such a blending silo operates as follows: When the container is filled, the product moves through the openings into the tubes, which are gradually filled. When the product is removed, it descends more rapidly in the tubes than in the container itself. However, the product continues to flow only into the uppermost opening of each tube, since the column of material, as it descends, becomes congested and cohesive at the bottom of the column, thus obstructing passage of the product through the lower openings. The uppermost openings of the individual tubes are displaced and located at different levels in such that when the silo is full, material can be removed from all zones of the silo and blended. Now if the level in the container drops, the upper openings end up, one by one, above the material, with the result that continued removal of the product from the collection funnel causes the level in the corresponding tubes to drop to the next lower opening, which then immediately takes over the function of the higher opening. This process is repeated until the container is empty and thus provides blends of roughly equivalent quality even when the contents of the container are different. By using a central outlet slide-valve and a regulator element located at the opening leading out of the collection funnel, it is also possible to partially regulate the blend.

Older blending silos having the same mode of operation but somewhat simpler in their construction have been in use, particularly for the mixture of grain.

All these known solutions have a common disadvantage. The blending effect can be improved only to the extent that the number of tubes and/or openings located at various levels above the silo outlet is increased. This means that the price of a silo increases roughly proportionate to the quality of the blend.

Consequently, the blending effect and the number of channels required for this effect must be determined in advance at the time of planning or selling. In many cases, it is difficult to determine the blending effect in advance owing to the fact that it is affected by variable operational factors. If one wants to avoid any risk, one must therefore always decide on a mixing silo with a large number of removal channels, i.e., one must decide for a costly silo.

In addition, a blending silo has been proposed which has a central removal mechanism extending over a portion of the storage container. This type of silo has three possible variants:

Variant A which has several tubes telescopically inserted into one another, all of which end at the bottom at the same elevation above the mixing funnel, but at different levels in the storage container. The smallest tube in the center extends farthest, while the largest and outermost tube extends least far into the storage container. In this way, material can be simultaneously removed and blended from various levels of the storage container. The annular channels are subdivided by means of circumferentially spaced vertical walls into four compartments.

Variant B has only a single, relatively large central removal tube, which, however, is separated into six circular segments by means of intermediate walls. At various levels, lateral openings provide access to the circular segments. The openings make it possible to remove and blend material at various levels.

Variant C is similar to variant A. Instead of several tubes, a triangular metal plate is twisted into several spirals with space between the spirals, resulting in the metal plate having the appearance of a wormgear. In this case too, vertical walls provide several subdivisions, with the result that there are openings at various levels.

If one compares these three variants, A, B and C, one is tempted to assume a development from variant A to variant B and from variant B to variant C. First of all, in the case of variant C, there is no "jump" from one opening to the next highest opening, as is the case with variants A and B. In the case of variant C, as is the case of variant A, the openings are spatially displaced in two dimensions, both with respect to their height and with respect to their relative distance from the vertical axis of the storage container.

The publication in which this mixing silo is described also provides interesting results from comparative tests.

A container with no internal blending components produced no practically usable blending effect; a result which is, of course, known.

Variant A approaches the theoretical mixing curve for a perfect mixture. B, on the other hand, deviates from this considerably and, quite surprisingly, the wormgear-like variant C is significantly worse than variant B. In the case of C, the result was so bad that it was in most cases unacceptable.

Another proposal is known, according to which a number of blending containers are arranged around a central tube. The central tube has a number of openings providing access to each blending container. These openings are so distributed that when the material is introduced, it can flow simultaneously only into one or two outer blending containers. The blending effect results from the fact that the blending containers are filled at different chronological intervals but emptied together simultaneously. When filling tubes with a small diameter are used, no troublesome de-blending processes have been known to arise as the bulk goods flow out, as happens with containers and silos having no internal components. On the other hand, de-blending can be expected in the mixing containers located around the central tube. Thus, this proposal does not solve the problem of gravit blending either. In this mechanism the quality of the blend depends on the type of material introduced. A bad blend in the introduced material cannot be improved later on when the silo is emptied. The major disadvantage of this solution consists in the fact that the container for a blend must be filled on one occasion and then completely emptied each time. Since nowadays a continuous operation is very often desired, this mixing container which requires "loading" would not be completely satisfactory.

SUMMARY OF THE INVENTION

Objects of this invention include the provision of a blending silo or gravity blender, which will provide a sufficiently good blending effect without a large number of connecting elements, which can either operate continuously or with "loading," which yields as nearly as possible the same blending effect when partially filled as when the silo is full, in which it is possible to handle the "loads" in the mixture according to their proportions in the blending container, and in which even small "loads" will be blended in the proper proportions.

The solution according to the invention is characterized by the fact that between the storage container and the connecting element a removal opening is located in the manner of a spiral on the outer circumference of the storage area or storage container, and by the fact that the connecting piece has a smaller cross-section than the container.

In this solution, material is actually simultaneously removed from an infinite number of zones distributed over the elevation. The problem of the formation of channels or "rat holes," which plagues many known solutions using central removal elements, is effectively eliminated, for although some have feared that when material is removed from a blending silo according to the invention with a spiral-shaped removal opening, the flow of material would show preference for the lowest part of the removal opening, this being the shortest route to the collection mechanism, this has not occurred.

The spiral-shaped removal opening located on the outer circumference of the storage container deprives the material of the "foothold" it needs for the formation of bridges and pile-ups. With even distribution over the circumference, material is, as it were, "peeled off" from every elevation-zone and carried to the collection mechanism in the correct proportion. To build a blending silo of even approximately equivalent value using the known solutions, it would be necessary to provide a large number of openings and removal tubes or channels. In fact, using known solutions, 30 to 50 removal tubes have been employed as elements connecting the storage container and the collection mechanism.

By contrast, the blending silo according to the invention makes it possible in all cases to attain a maximal blending effect for such gravity blending systems with relatively little effort expended in construction.

Using the same principle, a good blend is attained in the case of easily flowing bulk goods such as granulated plastic, even when the storage container is only partially filled. Only a very slight diminution of the blending effect can be ascertained owing to the slight thickness of the stratum, since a proportionately reduced amount is removed and blended from each elevation-zone of the column of bulk goods, which column consists of the individual "loads."

An outlet for the material located on the circumference results in a rearrangement of the horizontal strata, whereby the strata assume a bell-shaped structure. The bell-shaped stratification is spatially altered by the course of the removal opening. Now it has proved very advantageous to locate at least one central removal tube in the lowest part of the container. A relatively large central opening makes it possible to influence the bell-shaped structure in such a way that the peak coinciding with the vertical storage container axis is cleared away, thus resulting in a more level and hence more easily controllable formation of strata.

Further, it is even possible to favorably influence the blend quality by means of a slide-valve meter in the central outlet opening and a corresponding slide-valve in the outlet of the collection mechanism.

In another very advantageous version, the removal opening extends in one revolution over the entire elevation of the storage container, and/or has a cross-section which increases or decreases in size from top to bottom.

In many cases it is necessary to remove the same amount from the uppermost, i.e., most recently introduced material, as from the lower "loads." This happens primarily in those cases where supplementary treatment such as cooling or drying of the uppermost, freshly introduced silo material is not necessary.

In another advantageous version, additional residue removal openings are located below the removal opening which extends over the entire elevation of the blend. Such very advantageous versions make it possible to keep the blending process constant with variable filling levels in the container. Since, in these versions, the rate of descent of the material is significantly greater in the connecting element than in the storage container itself, material enters the connecting element only via that removal opening which at any time is highest but still below the level of the material.

If the container is only half filled, no material can be removed through that part of the removal opening which is located above the material. Consequently, at this point, the material descends in the connecting element to the elevation of the lower residue removal opening, and only then does the lower residue removal opening take over the function of the higher removal opening. This solution yields a very good blending effect at all filling levels, particularly in the case of goods which do not flow easily.

In another version, several spiral-shaped openings are located one above the other on the outer circumference surrounding the storage container. Because of the multifarious requirements met with in practice, it will always be necessary to create blending silos of different sizes. In these circumstances, this version has a very great advantage, since the individual removal openings located one above another can be incorporated into standard components. In this way it would be possible to realize blending silos running from the smallest heights all the way to 20 meters and more using the same standard components. In many cases it will be necessary to select a diameter for the removal openings which is small relative to the diameter of the connecting elements. In the case of materials which do not flow easily, it may also be advantageous to select a diameter for the lower removal openings which is greater than that of the higher ones. In this way the use of different removal openings make it possible to remove an equal amount of material from each elevation section.

In another version, regular lateral outflow can be attained even for the lowest section of the silo by building in a roof, the point of which faces upwards, in place of a central outlet for the lowest part of the silo.

In all versions it is, for example, possible to subdivide the connecting element, when necessary, by means of continuous vertical or slightly screw-shaped guide ridges.

Devices such as slide-valves etc., which affect the descent velocity can be built into the individual compartments, thus making it possible to regulate the blend amounts from individual zones, as is the case in known blending silos.

It is also possible to extend the guide ridges only to cover a certain elevation in the connecting element. Above these, additional guide ridges are provided which are displaced vis-a-vis the guide ridges by half a section on the circumference, such that the upper and the lower guide ridges, which are closest to each other encompass the entire elevation of the material to be removed. A lower removal opening can now be located in the area where the upper and the lower guide ridges come close to each other or possibly, when viewed from the front, overlap. In this way the guide ridges, which, in conjunction with each other, extend over the entire elevation, e.g., 6 units above and/or below, respectively, can assume two functions. On the one hand, the product does not move in the direction of the circumference, which is very advantageous in the case of products which trickle easily. The transitions from the upper to the lower guide ridges can now be arranged along a line which can be conceived of as having the shape of a spiral, i.e., when viewed in one circumferential direction, the lower guide ridges are progressively longer, while the guide ridges which are located with displacement above them are progressively shorter. If the lower removal opening is placed along the same imaginary spiral line, then it is very simple, even in the case of materials which tend to trickle, to remove material simultaneously through the upper and the lower removal opening with little or no difficulty. As a result, the blending effect can be improved without significant additional expenditure.

The drawings represent versions of the object of the invention, specifically:

FIG. 1 shows a schematic vertical section through a blending silo.

FIG. 2 schematically shows the mode of operation of the blending silo shown in FIG. 1, whereby the view is above the inner mantle which is shown as being straightened to a flat plane.

FIG. 3 schematically show a modified version with lower residue removal openings.

FIG. 5 shows a blending silo with inserts located one above another in the storage container.

FIG. 6 shows the inserts of FIG. 5 in a flattened form.

FIG. 7 shows a mantle located on the outside of the storage container and a collection mechanism in the form of a vibrating double funnel.

FIG. 8 shows the storage container of FIG. 7 in flattened form.

FIG. 9 shows the outer mantle of FIG. 7 in flattened form.

Figure 1:
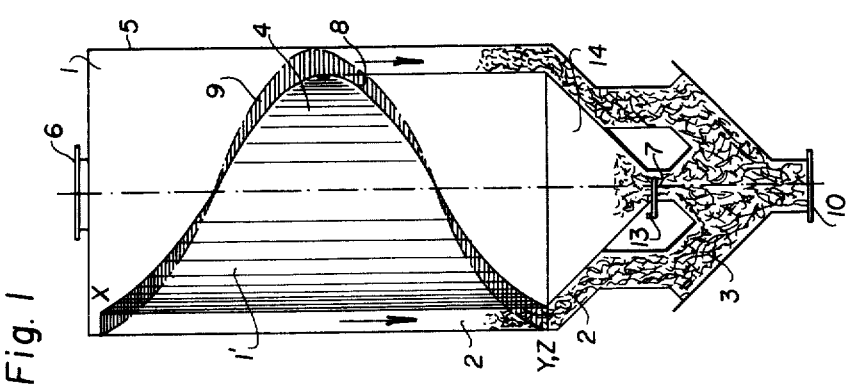

The blending silo of FIG. 1 consists essentially of three components: a container or storage container 1, a connecting element 2 having an annular cross section, and a collection mechanism 3. Container 1 is laterally bounded by a wall 5 and, at its top, has a loading opening 6. An inner cylindrical partition 4 located in container 1 is bounded at the top with a screw-shaped helical edge 8. Together with the adjacent part of outer wall 5, this upper edge 8 forms a helical removal opening 9, which extends over the entire circumference, as is indicated by horizontal hatching. The actual storage space 1' is formed in the lower area by the partition 4 of removal opening 9, and by the upper part of container 1 above the partition 4. The horizontal hatching of removal opening 9 of FIG. 1 has been adopted in FIG. 2 as a symbolic representation of the same removal opening 9. Corresponding to FIG. 1, the ends of the inner mantle 4 are also designated by the letters X, Y, and Z in FIG. 2. On the other hand, the triangle XZW represents an example of the stratification I - V corresponding to the qualities stored in container 1.

Figure 2:
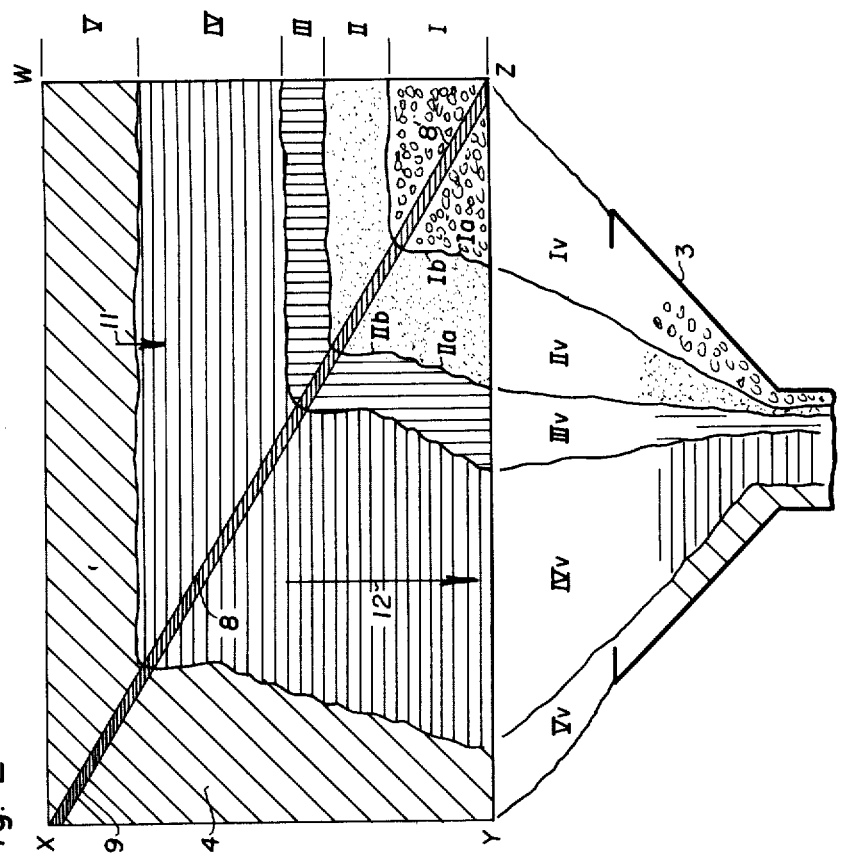

The operation of the blending silo according to the form of the invention illustrated in FIGS. 1 and 2 is as follows:

Container 1 is filled with material, whereby corresponding to FIG. 2 chronologically different qualities are introduced into the silo in different amounts. This results in the formation of strata or zones extending over the elevation of the silo. During the introduction of the first stratum I, a portion of this material also falls in the manner of a waterfall from inner partition 4 across a lower portion 8' of rim 8 and enters collection mechanism 3. In circular connecting element 2, the material (FIG. 2) can expand to the left in the manner of a cone of bulk material.

This process is repeated with the subsequent loads II, III, etc. Therefore, when the silo is full, there is already a rather good distribution of the loads in connecting element 2. The initial distribution is slightly inaccurate because of the slight distortion caused by the formation of the cone of bulk material.

Since the volume of the storage space 1' is very large relative to the content of collection mechanism 3 and relative to circular connecting element 2, this initial inaccuracy in the mixture can be ignored in most cases or, if necessary, the incorrect mixture can be conveyed back into container 1.

In the case of bulk material, there is almost no possibility of converting pressure energy into velocity as can be done in the case of liquids. As a result, interference with vertical movement in connecting element 2 caused by pressure in container 1 is eliminated, with the consequence that, when it is emptied, the material moves vertically in connecting element 2 which is indicated in FIG. 2 as a straight section 1b. During emptying, the material always moves vertically, as has already been confirmed by an initial mechanical test study.

Every silo builder is familiar with the problem of channelling or the formation of what is known as "rat holes." The entire contents of a silo or container exerts pressure against the outer wall and floor sections. The material flows only in a small cross section corresponding to the outlet opening, and this phenomenon extends over the entire elevation of the silo. The material flows from the top down, beginning with the material which was last introduced.

If such phenonomen, which does occur with previous solutions, also occurred in the blending silo according to the invention, the blending process per se would be purely illusory. However, the placement of the removal opening on the outer circumference of the storage space has proved to be very advantageous, particularly in the case of materials which flow poorly. The column of material in the storage space is deprived of a "foothold" over its entire circumference; the entire contents are forced downwardly and, consequently, no firm flow channels can develop over the entire elevation. The material is actually removed from a spiral-shaped zone in container 1 and introduced into collection funnel 3 via connecting element 2. At the bottom outlet 10 of collection mechanism 3, one then finds a cross-section of all the loads in the silo.

The individual loads I...V are shown on FIG. 2 at different levels, which is usually the case in practice. It is in this respect that the advantages of the solution according to the invention take on special importance. Even the smallest strata or loads are passed into collection mechanism 3 entirely proportionate to their presence in storage room 1'.

The fact is that if, using the known solutions, the product is removed via relatively distant openings, small loads in particular are removed from the storage space in the wrong proportions. If, by chance, the material representing a small load is located opposite an opening, too much of it is removed. If, on the other hand, it is located between two openings, nothing at all of it is passed into the collection funnel.

In this respect too, the invention represents considerable progress. Normally, the elevation of the spiral-shaped removal opening 9, or opening 2 of the silo of FIG. 3, will extend over the entire elevation of the blend, i.e., over the elevation which is to contribute material to the blend.

In an advantageous version of the invention, opening 9 extends over the entire height of container 1. For a container 15 meters or so high, this means that the spiral-shaped removal opening 9 will likewise be 15 meters high.

Figure 4:
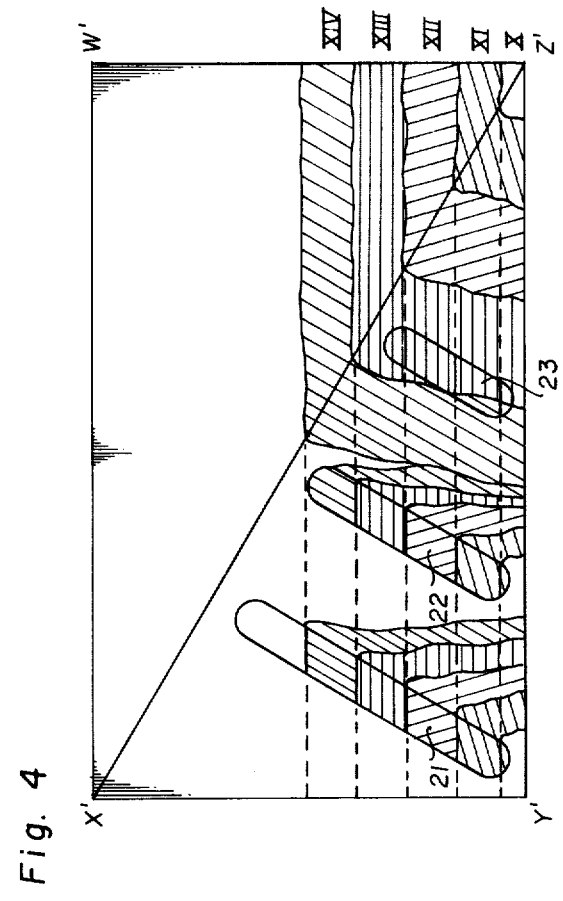
FIG. 4 shows the flattened form of the inner mantle of FIG. 3 and schematically the flow of the product when the container is half filled.
Figure 3:
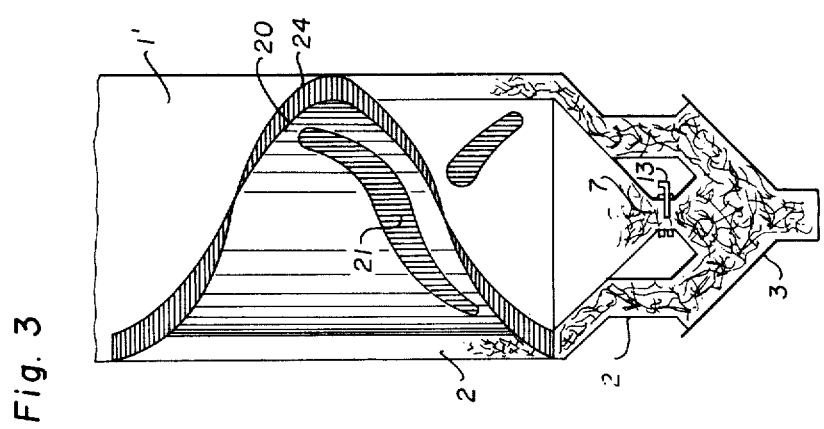

Frequently it is expected that when container 1 is half full, the blending effect should be approximately the same as when it is full. FIGS. 3 and 4 show a solution for high blending requirements. Several residue removal openings 21, 22, 23 are located below the removal opening 20, which residue removal openings are likewise located in spiral-shaped lines along the circumference of the storage area 1'. As long as the material flows down from the actual removal opening 20, the section located directly below, e.g., residue removal opening 23, is not in operation.

In a container with a ring-shaped bottom outlet, horizontally introduced strata shift to form a bell-shaped structure, the tip of which points upward. The greater the diameter of a container 1 relative to its height, the more this shifting process affects the blend quality of the whole plant.

Now it has been discovered that the spiral-shaped removal opening 9 or 20 in combination with a central regulatable outlet 7 (FIG. 1 and FIG. 3) for the material being handled in any particular case can favorably affect the shifting process.

The lateral removal opening 9 or 20 can successfully eliminate the formation of bridges and pile-ups. The central opening 7 can pass the material introduced first into the silo into collection mechanism 3 in a delayed fashion. A load of material introduced into the blending silo continuously diminishes in the lower container section 14 with a relatively low descent velocity, while in the upper part of storage space 1' it moves with greater velocity from top to bottom and likewise diminishes continuously.

Now for load-by-load operation of the blending silo as well as for the continuous flow principle, the dimensions of central outlet 7 can be selected in such a way that it passes on very little, e.g., 10% of the output of removal opening 2, into collection mechanism 3.

For this example it may be very advantageous to arrange the elevation of removal opening 9, 20 in such a way that 10% of the silo contents are in the lower container section 14 and are no longer influenced by removal opening 9, 20, e.g., as when an appropriate size is selected for the funnel-shaped lower container section 14 (FIG. 1). In this way, ideal blending ratios are very quickly attained, both in the load-by-load process and in the continuous operation process.

In the continuous operation process, a cross-sectional blend of the loads present in storage space 1', in our example the five preceding loads, are constantly present in lower container section 14.

Via removal opening 9, 20, "spherical segment-shaped" portions of the column of material in storage space 1' are removed in constant circulation. Considered with respect to its volume, each load is thus constantly reduced in size at a different point by the amount of material removed.

In FIG. 4 the direction of removal openings 21, 22, 23 is opposite that of removal opening 20. Of course, all the removal openings 20, 21, 22, 23 can be arranged in the same direction similar to FIGS. 5 and 6. This changes the removal ratios, which may, however, result in advantages depending on the material's tendency to trickle or other behavior. In the solution according to FIGS. 1 and 3, vertical guide ridges, not shown, can be provided to prevent the tendency to trickle from having a negative effect on the blending effect. FIG. 4 schematically shows the mode of operation of removal openings 20, 21, 22, 23, which are in part located one above the other, when the container is half full. The zones which are horizontally stratified one above the other are designated by X, XI, XII, XIII and XIV. The diagonal X', Z' corresponds to removal opening 20. Below this removal opening 20 are located the residue removal openings 21, 22 and 23. From each of the loads X to XIV an approximately equal amount of material can be removed via the residue removal openings 21 and 22. Residue removal opening 23 is not in operation when the container is half filled, since the material from that portion of removal opening 20 which is located directly above descends very rapidly in the connecting element, thus obstructing the entrance of material at a lower level. In the case shown, removal opening 20 comes in contact with the material only at half its elevation and, consequently, only with half the volume of the material. Nevertheless, also in this instance a proportionate amount of material from each of the loads X - XIV is passed into collection mechanism 3. In the uppermost part of residue removal opening 22 there occurs an insignificant falsification of the blend. If container 1 is imagined as filled only with and up to load XII, residue removal opening 23 also moves into action. In the case of the one-third filled storage space 1', material is removed in the right blend from storage space 1' via all openings 20, 21, 22 and 23. It is advantageous to combine this version too with a central removal channel 7.

Fig. 5 shows another very advantageous version. Two inserts 32 and 33 are located in a container 31 above one another. Both inserts 32, 33 contain helically extended openings 34 and 35 respectively. The material is introduced into a collection mechanism 37 via a connecting element 36 which is disposed below the two inserts 32 and 33 in the container 31. At the same time, a narrow annular passage 38 is provided as a direct connection from container 31 to collection mechanism 37. To prevent any material residues from remaining on the bottom of the container, a guide member 39 is located in the lower container section with the tip pointed upwards. Collection mechanism 37 can be mounted by means of a vibration generator 40. By means of this mechanism, which per se is well known as an aid to extraction, the finished blend can be extracted via a small opening 41 in a flat sloping floor, even in the case of bulk material which does not flow easily. A conical hood 42 closes off the upper end of connecting element 36. With this solution the initial inaccurate mixture can be reduced to a minimum.

In most cases it is convenient to select for openings 34 and 35 a somewhat smaller size than the circular surface of connecting element 36, which surface is produced between the storage container 31 and the two inserts 32 and 33. If in combination the surface, then, as a first approximation, the same removal performance can be assumed for the two openings. Of course, these cross-sectional ratios must be adjusted in each case to the flow properties of the material. For example, the openings 34, 35 of the individual inserts 32 and 33, which are placed above each other, may also be different.

Building in complete inserts 32, 33 has the special advantage that different silos can be built with a relatively small number of basic elements. If for any purpose the customer desires only a coarse blending effect, he could, for example, using this solution order a silo with only one insert, such that the removal opening would, for example, extend only over the lowest third of the silo. Of course, the free opening must be blocked against passage of material between the highest insert and the wall of container 1. Now if in the course of time the customer should determine that he would like to have the blending effect extend over a greater elevation in the silo itself, a second or third insert with possibly reduced removal openings is simply built in later above the first insert. In this solution, the actual storage space 1' is bounded by container 31 minus the contents of connecting element 36.

The structural design of removal opening 34, 35 into connecting element 36 can be quite significant with respect to technical considerations of strength. As shown again in FIG. 6, each of the two inserts 32 and 33 has a slit-like opening 34 or 35, in contrast to the solutions shown in FIGS. 1 and 2 where removal opening 9 is formed by the upper edge of an inner mantle 4 and the corresponding next closest wall-section of container 1. In FIG. 6, the inserts 32 and 33 are shown diagrammatically as having ridges 43 and 45 respectively, shown by dotted lines, which serve as guides for material flowing through the openings 34 and 35, and which also reinforce their respective inserts 32 and 33. As shown, the ridges 43 and 45 may extend longitudinally of the container 31 or inclined to the longitudinal dimension of the container 31.

The unrolled or flattened form of the cylindrical part of container 50 is shown in FIG. 8 and the flattened form of mantle 51 is shown in FIG. 9. In this modification, removal openings 52, 52', 52'' are located in container 50. It is simply a matter of construction whether one or the other of the variants is selected. In any case, in so doing there is no deviation from the basic principle of the solution according to the invention. In all solutions, the removal openings 52, 52', 52'' can run parallel, with a different angle of slope or with opposing directions of rotation.

Also, FIG. 7 shows the use of a collection mechanism in the form of a vibrating double funnel 54. With this arrangement, it is especially simple to vary the amount of material discharged through the central opening 55 by virtue of the fact that back-up congestion is generated by means of a main metering valve 57. In so doing, the amounts of material can vary precisely according to the surface ratios of the inner or outer outlet sections of the vibrating double funnel 54.

FIG. 7 also shows another design concept in the form of a material distributor operating at the time the material enters the silo. Located a little below the entrance opening 9 is a hood 58, for which other devices may also be substituted, which causes charges of material delivered to the container 50 to produce a bell-shaped stratification 59 which has a downward orientation. During extraction, an upward-oriented bell-shape occurs, such that thereby the blending effect can be additionally improved. If desired, the double funnel 54 or also the hood 58 can also be used in all versions of the invention, expecially in that according to FIG. 3.

It is conceivable that for purely structural reasons the walls of the container and the connecting element might be connected by means of cams, which are not shown, or be means of a large number of short but interrupted vertical or slightly diagonal ridge elements. In all silos, all parts must correspond to the structural requirements, with which fact the spiral-shaped removal opening cannot, of course, be permitted to interfere.

Thus it would, for example, be conceivable to provide several relatively large sub-breaks in the spiral-shaped opening to give the silo wall the required strength. To do this it is necessary to accept a certain diminution of the idea of the invention.

In the case of very large silos it would be conceivable under certain circumstances for these sub-breaks to occupy about 20–30% of the total opening, with the result that they do not affect its functioning, provided the sub-breaks have an acceptable flow shape.

What is claimed is:

1. A blending silo comprising:
   a. container structure including vertical radially inner and outer generally cylindrical walls defining an inner material receiving area and an outer annular material storage and removal area surrounding the receiving area;
   b. said inner wall having edge means extending helically of the container and comprising an edge extending continuously for substantially a full circumference of the container and over which material flows from said inner area to said outer area;
   c. collector means underlying said container structure;
   d. and connecting conduit means between said container structure and said collector means for delivery of material from said storage and removal area to said collector means.

2. The blending silo according to claim 1 in which said inner wall edge means defines the upper edge of said inner wall, said edge extending helically for substantially the height of said container structure.

3. The blending silo according to claim 1 in which said inner wall defines a helically extending slot opening therethrough, said edge means comprising one side of said slot.

4. The blending silo according to claim 1 in which said inner wall has a plurality of vertically spaced circumferentially elongated slots opening therethrough and extending helically of the inner wall, one side of each of said slots defining said edge means.

5. The blending silo according to claim 1 in which said inner wall has a plurality of circumferentially spaced helically elongated slots opening therethrough below said helically extending edge means.

6. The blending silo according to claim 5 in which said circumferentially spaced slots extend helically of the inner wall in circular directions generally opposite that of said edge means.

7. The blending silo according to claim 1 in which said collector means includes concentric inner and outer walls defining inner and outer collecting chambers for reception of material from the inner and outer areas respectively and tapering downwardly to define discharge openings, the discharge opening of said inner wall being disposed to deliver material from the inner chamber to the outer chamber, and supporting means suspending said collector means from said connecting conduit means.

8. The blending silo according to claim 7 in which said supporting means comprising a plurality of springs, and in further combination with means for imparting vibratory movements to said inner and outer walls of the collector means.

* * * * *